United States Patent [19]

Hu et al.

[11] Patent Number: 5,559,073

[45] Date of Patent: Sep. 24, 1996

[54] POLLUTION CONTROL CATALYST WITH MUTUAL PROTECTIVE DISTRIBUTED-ACTIVE-COMBINATIONS EACH INCLUDING NOBLE-METAL-ATOMS STABLY STRUCTURED AND PROTECTED THEREIN

[75] Inventors: Yimin Hu; Bifen Xu, both of Beijing, China

[73] Assignee: Beijing Huaxia Environmental Protection Company, Beijing, China

[21] Appl. No.: 312,139

[22] Filed: Sep. 26, 1994

[51] Int. Cl.⁶ .................................... B01J 23/38
[52] U.S. Cl. .................. 502/302; 502/326; 502/327; 502/525; 423/213.2
[58] Field of Search .................. 502/525, 326, 502/327, 302; 423/213.2

[56] References Cited

U.S. PATENT DOCUMENTS

| | | | |
|---|---|---|---|
| 3,897,367 | 7/1975 | Lauder | 502/525 |
| 4,049,583 | 9/1977 | Lauder | 502/525 |
| 4,126,580 | 11/1978 | Lauder | 502/525 |
| 4,140,655 | 2/1979 | Chabot et al. | 502/525 |
| 4,151,123 | 4/1979 | McCann, III | 502/525 |
| 4,511,673 | 4/1985 | Eto | 502/525 |
| 4,820,678 | 4/1989 | Xu | 502/525 |
| 4,849,398 | 7/1989 | Takada et al. | 502/525 |
| 5,057,482 | 10/1991 | Fukuda et al. | 502/525 |
| 5,182,249 | 1/1993 | Wang et al. | 502/525 |
| 5,185,311 | 2/1993 | Tabata et al. | 502/525 |
| 5,380,692 | 1/1995 | Nakatsuji et al. | 502/525 |

FOREIGN PATENT DOCUMENTS

| | | | |
|---|---|---|---|
| 62-225250 | 10/1987 | Japan | 502/525 |
| 1-307452 | 12/1989 | Japan | 502/525 |

*Primary Examiner*—Anthony McFarlane
*Assistant Examiner*—Walter D. Griffin
*Attorney, Agent, or Firm*—Bo-In Lin

[57] ABSTRACT

An exhaust gas catalyst for reducing the pollutant release containing in the exhaust gas. The catalyst includes a primary-core support. The catalyst also includes a distributed-catalytically-active multi-combination catalyst structure formed on the primary core support. The multi-combination catalyst structure includes an outermost gas-contact combination which includes atoms of metals selected from platinum group atomically immersed in the micro-space between a plurality of crystalline structures of composite oxides of a plurality of catalytically active metals and intimately attached to and protected by the crystalline structures in a protective inner combination.

9 Claims, 1 Drawing Sheet

POLLUTION CONTROL CATALYST WITH MUTUAL PROTECTIVE DISTRIBUTED-ACTIVE-COMBINATIONS EACH INCLUDING NOBLE-METAL-ATOMS STABLY STRUCTURED AND PROTECTED THEREIN

BACKGROUND OF THE INVENTION

1. Field of the Invention

This invention relates generally to a pollution control catalyst for treating the exhaust gases. More particularly, this invention relates to an improved catalyst which has a mutual protective distributed active layers each including noble-metal atoms stably structured and protected therein in the distributed-active-combination structure. The improved catalyst is stable, has high conversion efficiency, high resistance to catalyst poisons, and high temperature sustainability.

2. Description of the Prior Art

Continuous improvement of current technology in catalytic converters for purifying exhaust gas is limited by the technical difficulty that a high catalytic reactivity, which produces high conversion efficiency, often leads to lower operational stability due to low resistance to catalyst poisons and low sustainability when operated under high temperature. The demand for providing a solution is becoming more urgent due to the increasing number of automobiles thus causing the release of larger amounts of exhaust gases containing nitrous oxides (NOx), hydrocarbon (HC) and carbon monoxide (CO) and other types of pollutants into the atmosphere. The air polluted by the released exhaust gases poses serious threat to environment and human health. Therefore, the development of a highly effective catalytic converter which is capable of stable long term operation and can be manufactured at reasonable low cost has been a target for many research and development (R&D) projects.

Various types of catalyst are disclosed for treating the exhaust gases released from the internal combustion engines in order to remove the pollutants such as the hydrocarbon, carbon mono-oxide, and nitrous oxides. Saito et al. disclose in an U.S. Pat. No. 4,749,671, entitled 'Exhaust Gas Cleaning Catalyst and Process for Production Thereof' (Issued on Jun. 7, 1988), an exhaust gas cleaning catalyst composed of a refractory three dimensional structure which supports a catalytically active substance. The surface or part of the catalyst which is in contact with the exhaust gas is formed with numerous irregularly arranged protrusions composed of a refractory inorganic powder with different particle sizes. The catalyst according to Saito et al. is able to increase the efficiency by increasing the contact surface between the fine particles and the exhaust gas. It is also more effective in capturing the fine carbonaceous particles from the internal combustion engines. The invention disclosed by Saito et al. where the fine particles of the active catalyst are deposited on the surface for increasing the contact of the catalyst with the exhaust gas does not provide a solution to the problems that a high reactivity catalytic material is generally more vulnerable to the instability caused by either low resistance to catalyst poisons, low temperature sustainability, or low resistance to mechanical vibrations.

In another U.S. Pat. No. 4,492,769, entitled 'Pollution Control Catalyst for Internal Combustion Engine Exhaust System/Catalytic Converter and Process for Its Preparation' (Issued on Jan. 8, 1985), Blanchard et al. disclose a catalyst for a catalytic converter which is prepared by the steps of (a) coating and impregnating a support with a catalyst or palladium and at least one base metal element, (b) activating the catalyst at a temperature ranging from 120° to 800° C., (c) coating or impregnating the activated layer with another layer which has at least one platinum group of precious metal other than palladium and at least one other platinum group precious metal, and (d) activating the layer formed in step (c). The technique disclosed by Blanchard et al. may provide improvement in manufacturing process of palladium containing catalyst. It can be used to reduce the time and cost for producing the catalyst, but the technique does not provide a solution to overcome the basic technical difficulty that the active catalytic layer is vulnerable to the attack of the catalytic poisons and often becomes unreliable after being continuously operated under high temperature and vibration environment.

Hench et al. disclose in another U.S. Pat. No. 4,868,148, entitled 'Layered Automotive Catalytic Composite' (Issued Sep. 19, 1989), a catalytic composite for treating an exhaust gas from an internal combustion engine. The catalytic composite includes a first support which is a refractory inorganic oxide having dispersed thereon at least one noble metal component selected from the group consisting of platinum, palladium, rhodium, ruthenium and iridium and having dispersed immediately thereon an overlayer comprising at least an oxygen storage component and a second support which is a refractory inorganic oxide. The catalytic layer is separated from the oxygen storage component to minimize the formation of $H_2S$ over a catalytic composite. The unpleasant odor generated from $H_2S$ is greatly reduced by the use of this catalyst. The layered structure disclosed in this patent however still does not provide a solution to overcome the technical difficulty caused by the vulnerability of the active catalytic compounds when subject to continuous operation environment as described above.

In another U.S. Pat. No. 5,164,350, entitled 'Catalyst Composition for Purification of Exhaust Gas, Catalyst for Purification of Exhaust Gas and Process for Producing Said Catalyst' (Issued on Nov. 17, 1992), Abe et al. disclose a catalyst composition including a high silica zeolite having a Si/Al ratio of 40 or more, subject to ion exchange with at least one metal selected from Pt, Pd, Rh, Ir, and Ru, and a heat resistant oxide containing at least one metal selected from Pt, Pd, Rh, Ir, and Ru. The catalyst composition also includes a monolith carrier to support the catalyst thereon. The catalyst by Abe et al. is to provide a three way catalyst having sufficient heat resistance and processing high activity for purification. Meanwhile, according to Abe et al., the amount of expensive Rh component support on the carrier is reduced. The catalyst as disclosed by Abe et. al. provides apartial solution to the problem encountered by the conventional catalysts by increasing the temperature sustainability while providing high reactivity. However, the active catalytic metals as disclosed by Abe et al., still suffers from the problems that the active catalytic layer is vulnerable to the attack of the catalytic poisons. The sulfur oxides, phosphorous and zinc compounds contained in the exhaust gas may all cause a performance degradation of the the active catalytic layer in Abe's catalyst.

In yet another U.S. Pat. No. 5,182,249 entitled 'Non-precious Metal Three-way Catalyst', (Issued on Jan. 26, 1993), Wang et al. disclose a three way catalyst made of mixtures of catalytic components consisting of rare-earth metals and non-precious metal oxides. The catalyst includes a ceramic material as a first carrier comprising a mixture of metallic oxides stabilized by oxides of lanthanide elements disposed on or impregnated into the first carrier. A catalytically active layer structure including a second carrier and an oxides of rare earth metals are coated over the first carrier layer. The catalyst as disclosed by Wang et al. may be employed to reduce the manufacture cost because no precious metal is used. However, the practical usefulness of this catalyst converter is probability quite limited due to the fact that the conversion efficiency is likely not sufficient to be installed on an automobile exhaust pipe or an other kinds of internal combustion engines for actual applications.

Therefore, there is still a demand in the art of exhaust-gas catalyst manufacture to provide a catalytic composition and structure to overcome the technical difficulties encountered in the prior art. Specifically, this catalyst must be able to provide high reactivity rate while maintaining high resistance to catalytic poisons and capable of continuous and reliable operation with high degree of stability at high temperature and harsh vibrational environment for long period of time.

SUMMARY OF THE PRESENT INVENTION

It is therefore an object of the present invention to provide an exhaust gas catalyst to overcome the aforementioned difficulties encountered in the prior art.

Specifically, it is an object of the present invention to provide an exhaust gas catalyst with high reactivity rate while maintaining high resistance to attack by the catalytic poisons.

Another object of the present invention is to provide an exhaust gas catalyst with high reactivity rate and can sustain long term operation under high temperature with high degree of stability.

Another object of the present invention is to provide an exhaust gas catalyst with high reactivity rate and high mechanical strength to endure long-term load of vibration and temperature cycles.

Another object of the present invention is to provide an exhaust gas catalyst with high reactivity rate which can be manufactured economically by reducing the use of the very expensive elements of Rh, Pt and other precious metals.

Briefly, in a preferred embodiment, the present invention comprises an exhaust gas catalyst for reducing the pollutant release containing in the exhaust gas. The catalyst includes a primary-core support means. The catalyst also includes a distributed-catalytically-active multi-combination catalyst structure formed on the primary core support means wherein the multi-combination catalyst structure including an outermost gas-contact combination which including atoms of metals selected from platinum group atomically immersed in the micro-space between a plurality of crystalline structures of composite oxides of a plurality of catalytically active metals and intimately attached to and protected by the crystalline structures in a protective inner combination.

Extensive emission tests have been conducted to evaluate the efficiency of catalytic conversion for a catalyst of the present invention. One specific test was performed on a 1993 automobile equipped with 2.2 liter engine running on unleaded gasoline. The catalytic converter of the present invention was tested in accordance with U.S. Federal Test Procedure with the exception that the converter was first subject to a longer aging process than that required by the Federal Test Procedure. The converter was first subject to an accelerated 100-hour bench testing cycle which simulating a 50,000 miles accumulation of aging effects, i.e., twice as the requirement of 25,000 miles under the Federal Test Procedure for an 'after-market testing' process. Table 1 below shows the comparison of the average emission for the tested automobile with and without the catalytic converter of the present invention. Table 2 shows the conversion efficiency of the catalytic converter relative to current U.S. Environmental Protection Agency (EPA), and California Air Release Base (CARB) standards. High levels of conversion efficiency are achieved by the catalytic converters fabricated according to the techniques and methods disclosed in the present invention.

TABLE 1

| | Comparison: Pollutant Released with and without Converter of This Invention | |
|---|---|---|
| Pollutant Released | With 100-Hour Aged Cold-Start Average | Without Converter Cold-Start Average. |
| HC | 0.166 gm/Mile | 2.754 gm/Mile |
| CO | 2.60 | 10.68 |
| $NO_x$ | 0.69 | 5.80 |

TABLE 2

| | Comparison of Conversion Efficiency Converter of This Invention Relative to EPA and CARB Standards | | |
|---|---|---|---|
| Pollutant Released | This Invention % | EPA STD % | CARB STD % |
| HC | 94 | 70 | 70 |
| CO | 76 | 70 | 70 |
| $NO_x$ | 88 | 30 | 60 |

It is an advantage of the present invention that it provides an exhaust gas catalyst with high reactivity rate while maintaining high resistance to attack by the catalytic poisons.

Another advantage of the present invention is that it provides an exhaust gas catalyst with high reactivity rate and can sustain long term operation under high temperature with high degree of stability.

Another advantage of the present invention is that it provides an exhaust gas catalyst with high reactivity rate and high mechanical strength to endure long-term load of vibration and temperature cycles.

Another advantage of the present invention is that it provides an exhaust gas catalyst with high reactivity rate which can be manufactured economically by reducing the use of the very expensive elements of Rh, Pt, and other precious metals.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

According to the present invention, the structure of a three-component catalytic converter for purifying the exhaust gas is first described. More details of the processing steps are then further explained in each specific examples provided below.

Figure 1:
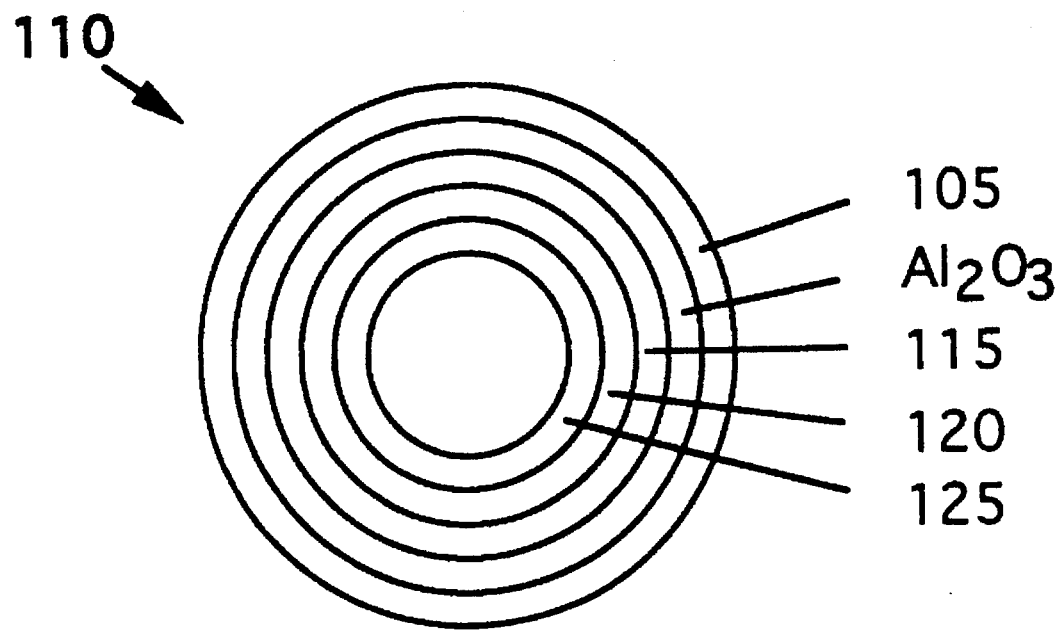
FIG. 1 is a cross-sectional view of a catalyst of the present invention.

FIG. 1 shows a catalytic converter 110 of the present invention constructed in a shape suitable for installation onto an automobile exhaust gas pipe. The catalyst converter 110 is formed on a primary support 105 which is generally in the form of a honeycomb monolith core composed of a ceramic material with high pore volumes (0.25–0.4 ml/g). A distributed-catalytically-active multi-combination structure 110 is then formed on the primary support 105. The distributed-catalytically-active multi-combination structure 110 includes a composite three-active-combination structure wherein a first active combination is a stabilizing and catalytically active combination 115 dispersed on the primary core 105 composed of composite oxide of catalytically active metals. Overlaying the first active combination 115 is a second active combination 120 composed of Perovskite composite oxides of catalytically active metals. A top combination 125 composed of a catalytically active metals, essentially palladium, is then overlaying the second active combination 120. The palladium atoms of the top combination 125 are dispersed over the second active combination 120 and atomically immersed in the micro-space between the crystalline structures of the Perovskite composite oxides and intimately attached to and protected by the crystalline structures.

Figure 2:
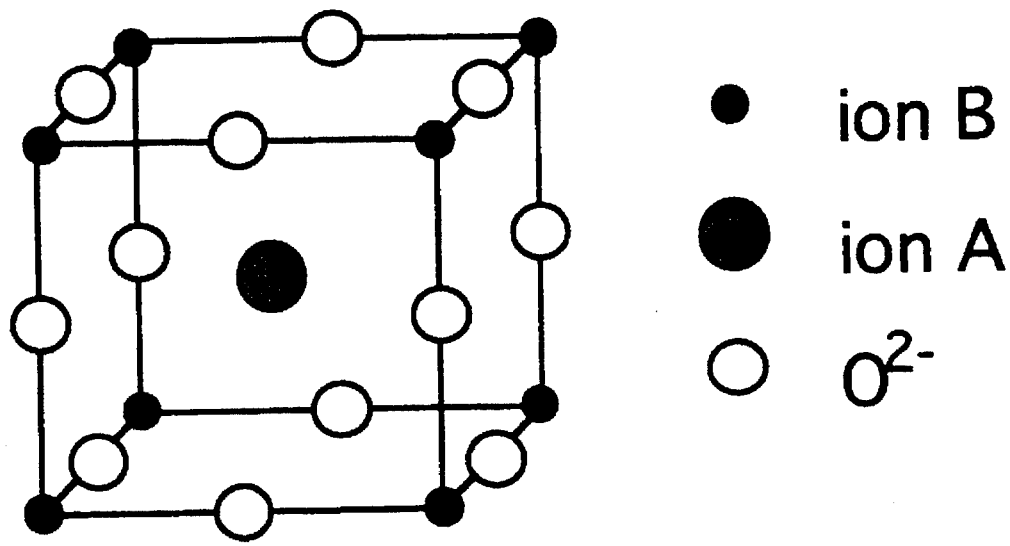
FIGS. 2 is a crystal structure diagram showing the adoption of an palladium or platinum atom into a crystal structure of the composite oxides of catalytically active metals.

FIG. 2 shows a crystal structure of the Perovskite composite oxide in the form of $ABO_3$. The crystal structure has a square box shape which includes an an atom A in the center of the box, eight B atoms each located at a corner, and twelve oxygen atoms each located at the center of eight edge lines of the crystal structure. The catalytically active atoms which may include elements represented by A or B are structured and protected by the integrated crystals. The Perovskite composite oxide may also more specifically represented as:

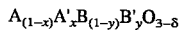

$$A_{(1-x)}A'_xB_{(1-y)}B'_yO_{3-\delta}$$

where A represents the rare earth metal elements, A' represents the alkaline-earth metal elements, while B and B' represent transition metal elements, and where $0.1<x<0.4$, $0.05<y<0.2$, and $0<\delta<0.5$.

The present invention discloses a catalyst 100 for reducing the pollutant release containing in the exhaust gas. The catalyst 100 includes a primary-core support means 105. The catalyst 100 also includes a distributed-catalytically-active multi-combination catalyst structure 110 formed on the primary core support means 105 wherein the multi-combination catalyst structure 110 including an outermost gas-contact combination 125 which including atoms of metals selected from platinum group atomically immersed in the micro-space between the crystalline structures of the Perovskite composite oxides of a plurality of catalytically active metals forming a protective inner combination 120 and intimately attached to and protected by the crystalline structures. In a preferred embodiment, the outermost gas-contact combination 125 includes substantial palladium. In another preferred embodiment, the protective inner combination 120 of composite oxides of catalytically active metals including Perovskite type of crystals of $ABO_3$ where A includes metals selected from groups 1A, 1B, 2A, 3B, 4A and 5A in the periodic table, i.e., the elements with atomic number from 58 to 71, or metals selected from a group consisting of actinons rare earth metals, i.e., metals with atomic number ranging from 90 to 104 which includes elements such as Th, Pa, U, Np, Pu, Am, Cm, Bk, Cf, etc. The atoms represented by A in the crystal structure can have a valence value ranging from one to three. In one of the preferred embodiments, the element A in the $ABO_3$ structure is actual $A_{(1-x)}$ where A has a valence value of three and can be an element selected from La, Pr, and Nd. While the element which makes up the x-part of the A element can be elements selected from the rare earth metals such as Ca, Sr, and Ba which have a valence value of two and part of that can be replaced by a Ce element. The element B can have a valence value of one to seven and can be selected from groups 1A, 1B, 2A, 2B, 3A, 3B, 4A, 4B, 5A, 5B, 6B, 7B, and the elements such as transition metals in 3d, 4s, 4d, or 5s in group 8. In a preferred embodiment, the catalyst select the B element from a group of metals consisting of Fe, Co, Ni, Mn, Zr, Li, and Pd. In yet another preferred embodiment, the primary-core support means 105 is composed of a ceramic material such as $2MgO·Al_2O_3·5SiO_2$.

This distributed-catalytically-active multi-combination structure provides a catalytic converter for purifying the exhaust gas with high thermal stability, high resistance to catalytic poisons while maintaining efficient catalytic conversion rate. Because of its structural stability under higher temperature, the second catalytically-active combination in the form of Perovskite composite oxides serves as a thermal protection combination for the first catalytically-active combination. Also, the first catalytically-active combination composed of oxides of catalytically active metals also serves as a thermal protection combination for the primary core support preventing re-crystallization, or phase changes of the aluminum oxides which are often used for supporting the catalytic converter thereon. Meanwhile, the catalytically-active metals, e.g., palladium, deposited on the top surface while greatly increases the reactivity level of the catalytic conversion by providing direct contact with the exhaust gas, are also protected by the second catalytically-active combination because the catalytically active metals, e.g., the palladium, are atomically immersed between the microspace between the crystals of the Perovskite composites and intimately attached thereon and being protected by the Perovskite composites on the atomic level.

In addition to the thermal protection described above, this distributed catalytically active multi-combination structure 110 also provides a mutual protection among each combination against the catalytic poisons. The catalytically active atoms in the first combination, i.e., the stabilizing and catalytically active combination 115 and the second active combination 120 protect the the stabilizing and catalytically active combination 115 form the undesirable formation of compounds of $AlO_3$ resulting from reactions between the nitrogen oxides or carbon monoxides in the exhaust gases with the aluminum atoms contained in the first combination 115. The second combination 120 with its Perovskite composite oxides provide protection for the outermost gas-contact combination 125 and the first combination 115 against sulfur, while the outermost gas-contact combination 125 including the palladium atoms protect the second combination 120 against lead. Thus the tightly structured integrated multi-combination, i.e., three-combination, structure 120 supported by the primary core support 105 formed a thermally and chemically stable catalyst because of the mutual protections provided by each combination for each other.

The primary core support 105 is first formed by depositing a combination of aluminum oxides on the surface of a ceramic honeycomb wherein for every square inch of surface area there are approximately 350 to 450 pores. The aluminum oxides can maintain phase stability at high temperature and have a high surface ratio of approximately 100 to 250 $M^2/g$. The primary core support 105 is heat-treated at a temperature of 900° to 1000° C. to obtain a stable γ-phase for the $Al_2O_3$. The deposition on the surface of the core support 105 is approximately 10–30% in weight of the entire primary carrier. The ceramic honeycomb covered with a combination of heat-treat aluminum oxides is ready to form a first catalytically-active combination which may includes catalytically active compounds of rare earth elements, base metals, or noble metals including but not limited to La, Ce, Pr, Nd, Ba, Ni, Zr, and Pd. The primary core support is immersed in a solution containing nitrate salts with weight ratios indicated in the following examples:

Example A: $La(NO_3)_3 \cdot 6H_2O$, $Ce(NO_3)_3 \cdot H_2O$, and $Pd(NO_3)_2 \cdot 2H_2O$ where the weight of La is about 0.2–3%, Ce is about 0.2–3% and Pd is about 0.05–0.1%;

Example B: $La(NO_3)_3 \cdot 6H_2O$, $Ce(NO_3)_3 \cdot H_2O$, and $Pd(NO_3)_2 \cdot 2H_2O$ where the weight of La is about 0.1–2%, Ce is about 0.2–3% and Pd is about 0.05–0.1%;

Example C: $La(NO_3)_3 \cdot 6H_2O$, $Ce(NO_3)_3 \cdot H_2O$, $Ba(NO_3)_2$, $Ni(NO_3)_2 \cdot 2H_2O$, $Pd(NO_3)_2 \cdot 2H_2O$, and $Zr(NO_3)_2 \cdot 2H_2O$ where the weight of La is about 0.1–3%, Ce is about 0.2–3%, Ba is about 0.1–0.5%, Ni is about 0.1–0.5%, and Pd is about 0.05–0.1%;

Example D: $La(NO_3)_3 \cdot 6H_2O$, $Ce(NO_3)_3 \cdot H_2O$, $Pr(NO_3)_3 \cdot 6H_2O$, $Nd(NO_3)_3 \cdot 6H_2O$, $Ni(NO_3)_2 \cdot 6H_2O$, $Pd(NO_3)_2 \cdot 2H_2O$ and $LiNO_3$ where the weight of La is about 0.1–2%, Ce is about 0.5–3%, and Pr, Nd, Ni, and Li each is about 0.1–0.5%, and Pd is about 0.05–0.1%; and Example E: $La(NO_3)_3 \cdot 6H_2O$, $Ce(NO_3)_3 \cdot H_2O$, $Pr(NO_3)_3 \cdot 6H_2O$, $Nd(NO_3)_3 \cdot 6H_2O$, $Ni(NO_3)_2 \cdot 6H_2O$, $Pd(NO_3)_2 \cdot 2H_2O$ and $LiNO_3$ where the weight of La is about 0.1–2%, Ce is about 0.2–3%, Pr, Nd, Ni, and Li each is about 0.1–0.5%, and Pd is about 0.05–0.1%.

The immersed and coated material is then dried at 180° C. for three hours, baked at 200°–600° C. for two to six hours to form the first catalytically-active combination formed with the composited oxides. The first catalytically-active-combination formed by above processes may have the following preferred combinations:

1. La 0.3–17%, Ce 0.5–9%, Pd 0.3–0.8%;
2. La 0.3–12%, Ce 0.5–8%, Ni 0.4–2%, Zr 0.3–4%, Pd 0.3–0.8%;
3. La 0.3–12%, Ce 0.5–6%, Ba 0.2–1%, Ni 0.4–2%, Zr 0.3–4%, Pd 0.2–1%;
4. La 0.2–10%, Ce 0.4–6%, Pr 0.4–2%, Nd 0.4–2%, Ni 0.3–2%, Li 0.3–4%, Pd 0.3–0.8%; and
5. La 6.2–10%, Ce 0.5–6%, Pr 0.4–2%, Nd 0.4–2%, Ni 0.3–2%, Zr 0.2–4%, Pd 0.3–0.8%.

A second catalytically-active combination comprising Perovskite composite oxides of metals including but not limited to La, Ce, Nd, Pr, Ba, Co, Mn, Fe, Zr, and Pd, is then formed covering the first active combination formed by the above described processes. To form the second active combination on the catalytic converter, the work product with the first catalytically-active combination deposited on the primary core support is immersed for ten to twenty minutes in a solution containing nitrate salts with weight ratios indicated in the following examples:

Example F: $La(NO_3)_3 \cdot 6H_2O$, $Ce(NO_3)_3 \cdot 6H_2O$, $Pr(NO_3)_3 \cdot 6H_2O$, $Nd(NO_3)_3 \cdot 6H_2O$, $Ba(NO_3)_2$, $Co(NO_3)_2 \cdot 6H_2O$, $Mn(NO_3)_2$, $ZrO(NO_3)_2 \cdot 2H_2O$, and $Pd(NO_3)_2 \cdot 2H_2O$ where the weight of La is about 0.2–3%, Ce is about 0.1–2%, and Pr, Nd, Ba each is at about 0.05–0.6%, Co is about 0.3–4%, Zr is about 0.05–0.4%, and Pd is about 0.05–0.1%;

Example G: $La(NO_3)_3 \cdot 6H_2O$, $Ce(NO_3)_3 \cdot 6H_2O$, $Pr(NO_3)_3 \cdot 6H_2O$, $Nd(NO_3)_3 \cdot 6H_2O$, $Ba(NO_3)_2$, $Mn(NO_3)_2$, $Fe(NO_3)_3$, $ZrO(NO_3)_2 \cdot 2H_2O$, and $Pd(NO_3)_2 \cdot 2H_2O$ where the weight of La is about 0.2–3%, Ce is about 0.2–2%, and Pr, Nd, Ba each is at about 0.05–0.6%, Mn is about 0.3–4%, Fe is about 0.2–4%, Zr is about 0.05–0.5%, and Pd is about 0.05–0.1%;

Example H: $La(NO_3)_3 \cdot 6H_2O$, $Ce(NO_3)_3 \cdot 6H_2O$, $Ba(NO_3)_2$, $Co(NO_3)_3 \cdot 6H_2O$, $Mn(NO_3)_2$, $ZrO(NO_3)_2 \cdot 2H_2O$, and $Pd(NO_3)_2 \cdot 2H_2O$ where the weight of La is about 0.5–4%, Ce is about 0.3–2%, Ba is about 0.05–1%, Co is about 0.3–4%, Mn is about 0.3–4%, Zr is about 0.05–0.4%, and Pd is about 0.05–0.1%;

Example I: $La(NO_3)_3 \cdot 6H_2O$, $Ce(NO_3)_3 \cdot 6H_2O$, $Co(NO_3)_3 \cdot 6H_2O$, $Mn(NO_3)_2$, $ZrO(NO_3)_2 \cdot 2H_2O$, and $Pd(NO_3)_2 \cdot 2H_2O$ where the weight of La is about 0.6–6%, Ce is about 0.3–2%, Co is about 0.3–4%, Mn is about 0.3–4%, Zr is about 0.05–0.4%, and Pd is about 0.05–0.1%;

Example J: $La(NO_3)_3 \cdot 6H_2O$, $Ce(NO_3)_3 \cdot 6H_2O$, $Co(NO_3)_3 \cdot 6H_2O$, $Mn(NO_3)_2$, $LiNO_3$, and $Pd(NO_3)_2 \cdot 2H_2O$ where the weight of La is about 0.3–5%, Ce is about 0.1–2%, Co is about 0.3–4%, Mn is about 0.3–4%, Li is about 0.05–0.4%, and Pd is about 0.016–0.075%; and Example K: $La(NO_3)_3 \cdot 6H_2O$, $Ce(NO_3)_3 \cdot 6H_2O$, $Mn(NO_3)_2$, $Fe(NO_3)_3$, $ZrO(NO_3)_2 \cdot 2H_2O$, and $Pd(NO_3)_2 \cdot 2H_2O$ where the weight of La is about 0.6–5%, Ce is about 0.3–2%, Mn is about 0.3–4%, Fe is about 0.3–4%, Zr is about 0.05–0.5%, and Pd is about 0.05–0.1%.

The immersed and coated samples are dried at a temperature of approximately 180° C. for three hours and then baked at a temperature between 200° to 850° C. for ten hours to form a combination of $ABO_3$ type of Perovskite composite oxides. The composite oxides basically has a composition represented by $ABO_{3-\delta}$ where δ is a small number. This can be understood by examining a composition:

$$(La_{0.7}Ce_{0.3})(Mn_{0.45}Co_{0.45}Zr_{0.06}Pd_{0.04})O_{3-\delta}$$

where the total value of valence for A and B is 6.3 while that of $O_3$ is 6.0 thus making this compound an oxygen deficient compound. This composite oxide $ABO_{3-\delta}$ is particularly effective to react with carbon mono-oxide and nitrogen oxide $NO_x$.

A third catalytically-active combination then formed on top of the second active combination. The third active combination, i.e., the outermost combination, is composed noble metals such as Pd or Pt. In one preferred embodiment of the present invention, the noble metal for this third combination comprises only Pd. The third combination is formed by immersing the sample coated with the first active combination 115 and the second active combination 120 in a solution including one-in-fifteen-hundred (1:1500) to one-in-twenty-five-hundred (1:2500) of $PdCl_2$ or $Pd(NO_3)_2 \cdot 2H_2O$ wherein the weight ratios of Pd is approximately 0.05 to 0.1%. After the sample is immersed for about one hour, it is removed from the solution and baked at 180° C. for about two hours and heat treated at 400° C. for approximately two hours. The heated treated sample is then immersed in a hydrogen container for two hours to convert the chemical compositions from $PdCl_2$ or $Pd(NO_3)_2 \cdot 2H_2O$ back to Pd metal crystals. It is then totally cooled to a room temperature and thus completing the fabrication process. A catalyst converter is thus formed wherein the composition of the outermost combination preferably contains Pd with a weight ratio of about 0.05 to 0.12%. When the outermost combination containing a noble metal of Pt only, the weight ratio of Pt is about 0.032 to 0.16%, and when it is composed of only Pd, the weight ratio of Pd can be in a range of about 0.05 to 0.3%.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A catalyst for reducing the pollutant release contained in an exhaust gas comprising:

a primary-core support means; and a distributed-catalytically-active multi-combination structure formed on said primary core support means wherein said multi-combination structure includes a three active combination structure having a first stabilizing and catalytically active combination formed on top of said primary core support, a Perovskite composite of catalytically active combination overlying said first stabilizing and catalytically active combination, and an outermost gas-contact combination wherein each of these three active combination includes material compositions of catalytically active noble metals thus forming mutual protective layers therein.

2. The catalyst of claim 1 wherein:

said material compositions of catalytically active noble metals included in each of said three active combinations include material compositions of palladium.

3. The catalyst of claim 2 wherein:

said Perovskite composite of catalytically active combination includes Perovskite crystals containing noble metals represented by a formula $ABO_3$ where A includes metals selected from groups 1A, 1B, 2A, 3B, 4A and 5A in the periodic table including the elements with atomic number from 58 to 71, or metals selected from a group consisting of actinons rare earth metals including metals with atomic number ranging from 90 to 104 and said element B being selected from groups 1A, 1B, 2A, 2B, 3A, 3B, 4A, 4B, 5A, 5B, 6B, 7B, and the elements of transition metals in 3d, 4s, 4d, or 5s in group 8.

4. The catalyst of claim 3 wherein:

said outermost gas-contact combination includes palladium atoms wherein said palladium atoms are immersed in a plurality of micro-spaces between a plurality of said Perovskite crystals containing noble metals and intimately attached to and protected by said Perovskite crystals.

5. The catalyst of claim 4 wherein:

said stabilizing and catalytically-active combination includes composite oxides of catalytically active compounds of rare earth elements, base metals, and at least one element of noble metals.

6. A catalyst for reducing the pollutant release contained in an exhaust gas comprising:

a primary-core support means composed of a ceramic material including $2MgO.Al_2O_3.5SiO_2$;

a distributed-catalytically-active multi-combination structure formed on said primary core support means wherein said multi-combination structure includes a three active combination structure having a first stabilizing and catalytically active combination formed on top of said primary core support, a Perovskite composite of catalytically active combination overlying said first stabilizing and catalytically active combination, and an outermost gas-contact combination wherein each of these three active combinations includes material compositions of catalytically active noble metals thus forming mutual protective layers therein; said Perovskite composite of catalytically active combination includes Perovskite crystals containing noble metals represented by a formula $ABO_3$ where A includes metals selected from groups 1A, 1B, 2A, 3B, 4A and 5A in the periodic table including the elements with atomic number from 58 to 71, or metals selected from a group consisting of actinons rare earth metals including metals with atomic number ranging from 90 to 104 and said element B being selected from groups 1A, 1B, 2A, 2B, 3A, 3B, 4A, 4B, 5A, 5B, 6B, 7B, and the elements of transition metals in 3d, 4s, 4d, or 5s in group 8;

said outermost gas-contact combination includes palladium atoms wherein said palladium atoms are immersed in a plurality of micro-spaces between a plurality of said Perovskite crystals and intimately attached to and protected by said Perovskite crystals; and said stabilizing and catalytically-active combination includes composite oxides of catalytically active compounds of rare earth elements, base metals, and at least one element of noble metals.

7. A catalyst for reducing the pollutant release contained in an exhaust gas of combustion engine comprising:

a primary-core support means composed of a ceramic material including $2MgO.Al_2O_3.5SiO_2$ honeycomb monolithic core;

a distributed-catalytically-active multi-combination structure formed on said primary core support means wherein said multi-combination structure includes a distributed-catalytically-active multi-combination structure formed on said primary core support means wherein said multi-combination structure includes a three active combination structure having a first stabilizing and catalytically active combination formed on top of said primary core support, a Perovskite composite of catalytically active combination overlying said first stabilizing and catalytically active combination, and an outermost gas-contact combination wherein each of these three active combinations includes material compositions of catalytically active noble metals thus forming mutual protective layers therein;

said Perovskite composite of catalytically active combination includes Perovskite crystals containing noble metals represented by a formula $A_{(1-x)}A'_xB_{(1-y)}B'_yO_{3-\delta}$ where A includes metals selected from rare earth metals, A' includes metals selected from alkaline metals or alkaline-earth metals, B and B' include metals selected from transition metals, where $0.1<X<0.4$; $0.05<Y<0.2$; and $0<\delta<0.5$;

said outermost gas-contact combination includes palladium atoms wherein said palladium atoms are immersed in a plurality of micro-spaces between a plurality of said Perovskite crystals and intimately attached to and protected by said Perovskite crystals wherein the weight of said palladium atoms is about 0.07 to 0.13% of said primary core support means; and said stabilizing and catalytically-active combination includes composite oxides of catalytically active compounds of rare earth elements, base metals, and at least one element of noble metals.

8. The catalyst of claim 7 wherein:

said composite oxides of catalytically active compounds include oxides of metallic atoms selected from La, Ce, Pr, Nd, Ni, Zr, Pd and Ba; and said rare earth metals in said Perovskite crystals include metals selected from La, Ce, Pr, and Nd.

9. The catalyst of claim 8 wherein:

said composite oxides of catalytically active compounds include oxides of metallic atoms selected from the following combinations: (i) oxides of La, Ce, and Pd; (ii) oxides of La, Ce, Ni, Zr, and Pd; (iii) oxides of La, Ce, Ba, Ni, Zr, and Pd; (iv) oxides of La, Ce, Pr, Nd, Ni, Li, and Pd; (v) oxides of La, Ce, Pr, Nd, Ni, Zr, and Pd; and said rare earth metals in said Perovskite crystals include metals selected from following material compositions: (i) $La_{0.4}\ Pr_{0.1}\ Nd_{0.1}\ Ce_{0.3}\ Ba_{0.1}\ Co_{0.45}\ Mn_{0.45}\ Zr_{0.06}\ Pd_{0.04}\ O_3$ (ii) $La_{0.4}\ Pr_{0.1}\ Nd_{0.1}\ Ce_{0.3}\ Ba_{0.1}\ Mn_{0.4}\ Fe_{0.45}\ Zr_{0.06}\ Pd_{0.04}\ O_3$; (iii) $La_{0.6}\ Ce_{0.3}\ Ba_{0.1}\ Co_{0.45}\ Mn_{0.45}\ Zr_{0.06}\ Pd_{0.04}\ O_3$; (iv) $La_{0.7}\ Ce_{0.3}\ Co_{0.45}\ Mn_{0.45}\ Zr_{0.06}\ Pd_{0.04}\ O_3$; (v) $La_{0.7}\ Ce_{0.3}\ Li_{0.06}\ Co_{0.45}\ Mn_{0.45}\ Pd_{0.04}\ O_3$; and (vi) $La_{0.7}\ Ce_{0.3}\ Mn_{0.45}\ Fe_{0.45}\ Zr_{0.06}\ Pd_{0.04}\ O_3$.

* * * * *